Jan. 17, 1956   E. H. CUMMINGS   2,731,285
SEGMENTAL METALLIC PACKING RINGS
Filed March 31, 1953   2 Sheets-Sheet 1
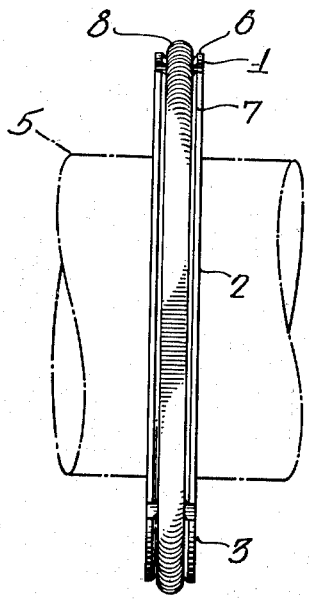
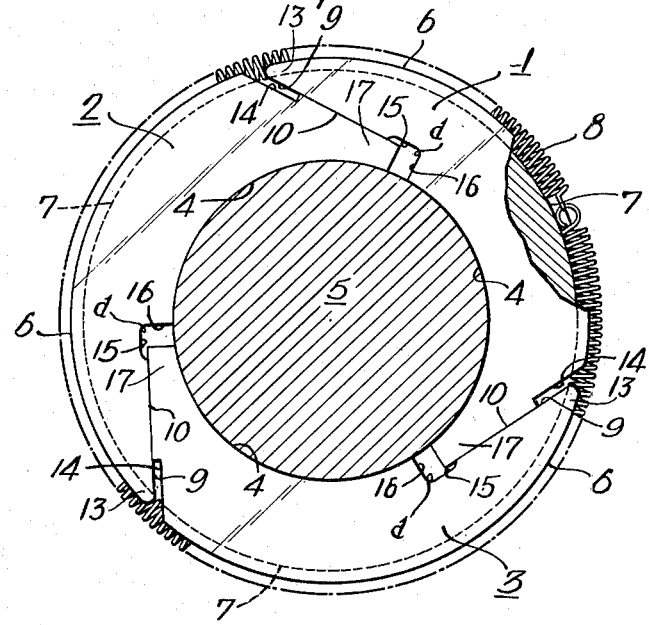
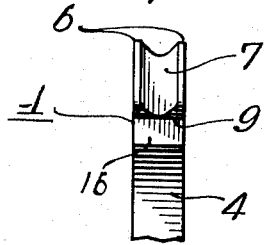
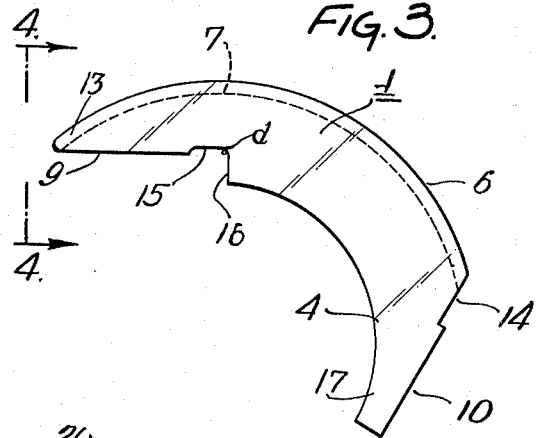
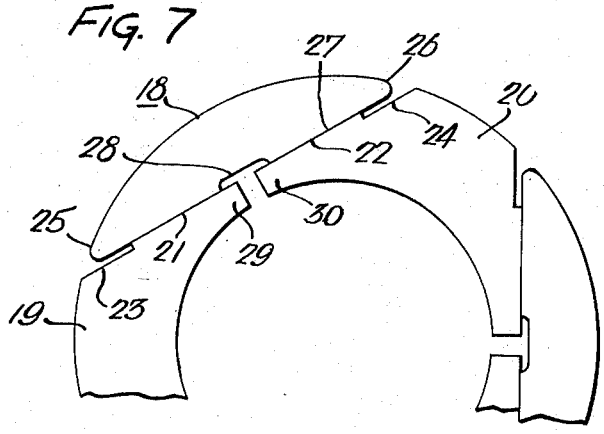
Inventor:
Edwin H. Cummings
by his Attorneys
Howson & Howson

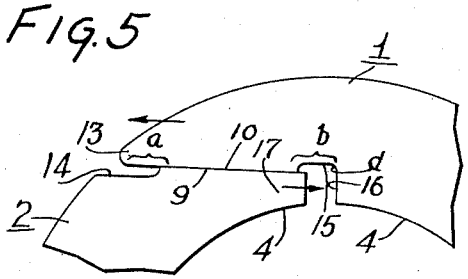
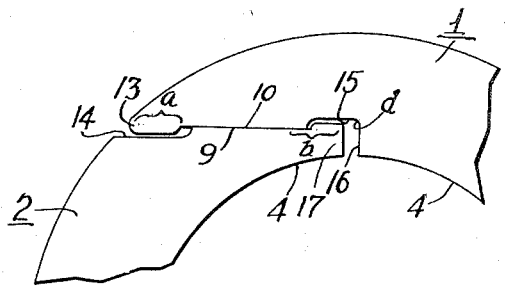

United States Patent Office 2,731,285
Patented Jan. 17, 1956

2,731,285

SEGMENTAL METALLIC PACKING RINGS

Edwin H. Cummings, Philadelphia, Pa., assignor to France Packing Company, Philadelphia, Pa., a corporation of Pennsylvania Application March 31, 1953, Serial No. 345,782

3 Claims. (Cl. 288—13)

This invention relates to an improvement in segmental packing rings of the general type disclosed in the France Patent No. 636,512, dated November 7, 1899, and a principal object of the invention is to provide a ring of this type that will be characterized by exceptional durability and strength and wherein the functional relationship of the segments remains substantially undisturbed over the life of the ring.

One such ring is illustrated in the attached drawings wherein:

Figure 1 is a side view partly in section of a ring made in accordance with my invention showing the ring in place upon a shaft;

Figure 2 is an edge view of the packing ring;

Figure 3 is a side view of one of the segments of the packing ring;

Figure 4 is a fragmentary end view of the segment as viewed from the line 4—4, Figure 3;

Figure 5 is an enlarged fragmentary side view showing the improved relief segments afforded by the present invention;

Figure 6 is a view similar to Figure 5 showing the manner in which the relief segments function to avoid the fault of the prior conventional segments, and Figure 7 is a fragmentary face view of a modified form of ring made in accordance with the invention.

The packing ring shown in Figures 1 to 6 of the drawings comprises three segments, 1, 2 and 3 respectively, which are identical in form and which are designed to fit together in annular series arrangement to form the body of the ring. The inner surface 4 of the individual segment is formed on the arc of a circle of predetermined radius conforming to the radius of the shaft or other cylindrical element 5 with which the ring is to cooperate. The outer edge surface 6 of the individual segment is generally concentric with the inner arcuate surface 4 so that when the latter surface engages the surface of the shaft 5 the surfaces 6 of the several segments will approximately also define the circumference of a circle. The outer edge surface 6 of the segment is grooved as indicated at 7 in Figure 4 for reception of an annular coiled spring 8, see Figure 2, which in assembly functions to retain the segments in their annular series relationship pressed resiliently against the surface of the shaft.

The terminal surfaces 9 and 10 are designed for sliding contact respectively with the corresponding surfaces 10 and 9 of the immediately adjoining segments. Thus, as shown in Figure 1, the surface 9 of the segment 1 abuts the confronting surface 10 of the segment 2. Each of these surfaces in the present instance is flat and plane and is tangent to a cylinder of greater diameter than the diameter of the inner peripheral surface of the ring, and each forms an efficient extended bearing seat for the other. Similarly, the surface 10 of the segment 1 seats flatly against the confronting surface 9 of the segment 3, the same essential relationship existing between these surfaces as between the surface 9 of the segment 1 and the surface 10 of the segment 2. It will be noted that these terminal surfaces are arranged so that radial contraction of the ring as a whole by mutual radial movements of the individual segments will not result in separation of the confronting surfaces 9 and 10 of the respective segments, and will merely result in a longitudinal relative sliding movement of the segments along these surfaces. Insofar as described, the ring is conventional and its mode of operation is well known in the art to which it pertains.

It has been found that in the normal use of a ring of character as previously made, as illustrated for example in the aforesaid United States patent, and particularly where the ring is subjected to high fluid pressure, there is a tendency as a result of combined wear and yielding of the material of the segments for bumps or protrusions to develop in the areas indicated at $a$ and $b$ in Figure 5. The presence of these bumps may result in a malfunction of the ring, for as the ring compensates for wear on the surfaces 4 and the segments move with respect to each other as indicated by the arrow in Figure 5, the bumps will tend to relatively tilt the segments from normal positions. The packing ring then not only fails to perform its intended function as a seal, but the segments, finding support only at their extreme ends, tend to crack under the external pressures.

I have found that these difficulties can be overcome by providing each of the segments with relief recesses 14 and 15, shown best in Figure 5. The recess 14, embracing the critical area $a$, extends inwardly from the outer periphery of the segment to a point inwardly of the terminal end 13 of the adjoining segment and effectively prevents malformations of the aforesaid nature in the area $a$. The recess 15, embracing the critical area $b$, extends from the shoulder 16 to a point beyond the inner end portion 17 of the adjoining segment and effectively prevents malformations in that area. The normal relationship of the surfaces 9 and 10 thereby remains unchanged and the original functional relationship of the segments to each other is not disturbed by the relative adjustments of the segments referred to above. It will be apparent also that any tendency to develop the aforesaid bumps at the outer end of the surface 10 and at the inner end of the surface 9 will have no affect upon the normal relation of the said surfaces and of the segments, in that the relative adjustments of the segments due to wear on the surfaces 4 occur in directions wherein the bumps are withdrawn further from the interseating areas of the surfaces 9 and 10. This is illustrated clearly in Figure 6.

In addition to the provision of the relief recesses described above, I have found it of advantage to provide a substantial fillet at the juncture $d$ of the shoulder 16 and the bottom of relief recesses 15, see Figure 5, so as to remove a point of possible critical stress concentration in the segment and thereby to materially strengthen the ring, this fillet in conjunction with the relief recesses providing a ring of exceptionally long wearing characteristics wherein the functional efficiency remains substantially undiminished over the life of the ring.

In the embodiment of Figure 7, the forms of the segmental elements of the ring are somewhat different from that of the segments of the previously described ring. The essential relationship between the elements is the same, however, and the ring is subject to the same degenerative faults. In this case the segments 18 seat upon the ends of two adjoining segments 19 and 20 and, in accordance with the invention contact between the terminal ends of each of the segments which would normally engage the proximate seating surface of the immediately adjoining segment is relieved by a recess in the latter surface. The working of the said seating surfaces by the terminal ends of the segments, which working causes the objectionable bumps or protrusions previously described is thereby avoided.

In the embodiment under discussion the outer ends of the seating surface 21 and 22 of the segments 19 and 20 respectively are recessed, at 23 and 24, so as to relieve the terminal ends 25 and 26 of the segment 18; and the seating surface 27 of the segment 18 is recessed at the mid section 28 to relieve the terminal ends 29 and 30 of the segments 19 and 20 respectively. In the absence of these recesses there would be a tendency, particularly if the ring were used under the higher fluid pressure conditions, toward the development at the outer ends of the seats 21 and 22 of the typical protrusions described above, and also on the segment 18 at the center of the seat 27 between the terminal ends 29 and 30 of the segments 19 and 20. The effect of these protrusions, which effect develops as wear on the inner periphery of the ring permits a contractive relative adjustment of the segments, is to lift the segment 18 away from its normal seat on the segments 19 and 20, causing the ring to leak; and the protrusion at the center of the segment 18 may also act as stops preventing inward movement of the segments 19 and 20 in the said contractive adjustment with resultant leakage at the inner periphery of the ring.

I claim:

1. An annular packing ring, comprising a plurality of complementary flat sided segmental sections, the terminal portions of each section being in overlapped and interseated relation with the respective proximate terminal portions of the adjoining sections, the interseating surfaces defining flat planes normal to the flat sides of the sections and tangent to a cylinder of greater diameter than the diameter of the inner peripheral surface of the ring and constituting the sole areas of contact between the sections, the confronting surfaces of the sections in the respective interseating areas being recessed and said recesses being disposed opposite to the terminal extremities of the respective overlapped portions so that said extremities are excluded from the said interseating surfaces.

2. A packing ring according to claim 1 wherein the said segmental sections are three in number, said sections being identical in form, and the terminal portions of each section differing from and being complementary to each other so as to afford the said overlapped and interseated relation between the respective proximate terminal portions of the adjoining sections.

3. A packing ring according to claim 1 wherein the said segmental sections are six in number, three of said sections being identical and forming collectively the inner peripheral surface of the ring, and the other three of said sections being identical and differing from the first named three sections and collectively with the latter sections forming the outer peripheral surface of the ring.

References Cited in the file of this patent

UNITED STATES PATENTS

| | | |
|---|---|---|
| 636,512 | France | Nov. 7, 1899 |
| 965,688 | Claflin | July 26, 1910 |
| 1,735,466 | Le May | Nov. 12, 1929 |
| 1,822,521 | Fox et al. | Sept. 8, 1931 |

FOREIGN PATENTS

| | | |
|---|---|---|
| 3,179 | Great Britain | of 1902 |